United States Patent Office 3,502,681
Patented Mar. 24, 1970

3,502,681
7- OR 8-CHLORO-4-PHENYLAMINO-
CHLOROQUINOLINES
André Allais, Les Lilas, and Jean Meier, Coeuilly-
Champigny, France, assignors to Roussel-UCLAF,
Paris, France
No Drawing. Filed Apr. 10, 1968, Ser. No. 720,345
Int. Cl. C07d 33/52
U.S. Cl. 260—287                                11 Claims

ABSTRACT OF THE DISCLOSURE 7- or 8-chloroquinolines of the formula

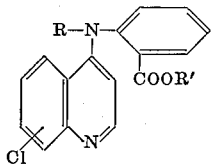

wherein R is selected from the group consisting of alkyl of 1 to 8 carbon atoms, alkenyl of 2 to 8 carbon atoms and carboxyalkylene of 2 to 7 carbon atoms and R' is selected from the group consisting of hydrogen and alkyl of 1 to 8 carbon atoms and their non-toxic, pharmaceutically acceptable acid addition salts which products possess strong anti-inflammatory activity without analgesic activity.

Prior art

Related quinolines in which R is hydrogen are known as can be seen from French Patents Nos. 1,369,967 and 1,421,229, which compounds are known to possess both analgesic and anti-inflammatory activity. The analgesic properties of these compounds are shown by a rapid passage into the blood stream and the maximum concentration of the said compounds in the blood stream is quickly reached and lasts for about 3 hours.

Objects of the invention

It is an object of the invention to provide the novel chloroquinolines of Formula I and their acid addition salts.

It is a further object of the invention to provide a novel process for the preparation of the chloroquinolines of Formula I.

It is another object of the invention to provide novel anti-inflammatory compositions.

It is an additional object of the invention to provide a novel method of reducing inflammation in warm-blooded animals.

These and other objects and advantages of the invention will become obvious from the following detailed description.

The invention

The novel compounds of the invention are chloroquinoline selected from the group consisting of compounds of the formula

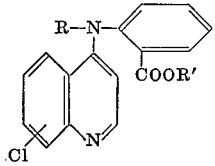

wherein R is selected from the group consisting of alkyl of 1 to 8 carbon atoms, alkenyl of 2 to 8 carbon atoms and carboxyalkylene of 2 to 7 carbon atoms and R' is selected from the group consisting of hydrogen and alkyl of 1 to 8 carbon atoms and their non-toxic, pharmaceutically acceptable acid addition salts and the chlorine is in the 7- or 8-position.

An example of a suitable acid for the formation of a non-toxic, pharmaceutically acceptable acid addition salt is hydrochloric acid.

The said novel compounds possess interesting pharmacological activity, namely a strong anti-inflammatory activity and surprisingly without analgesic activity. This indicates a different mode and type of action in comparison with the prior art compounds. The compounds of the invention pass slowly but progressively into the blood stream whereby their anti-inflammatory activity is more durable and prolonged than the prior art compounds in which R is hydrogen and is as intensive in activity as the prior art unsubstituted compounds. Indeed, the pharmacological inflammation tests bring out the progressive and durable appearance of an inflammatory phenomena due to a chemical, physical or bacterial toxic agent. The continuance of such an intense anti-inflammatory activity as that of the compounds which are unsubstituted at the nitrogen atom, clearly demonstrates that the novel compounds exhibit a new type of action which appears with more delay but lasts longer.

Examples of suitable alkyl radicals for R' are methyl, ethyl, n-propyl, isopropyl, n-butyl, n-octyl, etc. Examples of suitable radicals for R are alkyl radicals such as methyl, ethyl, n-propyl, isopropyl, n-butyl, etc.; alkenyl radicals such as allyl, etc. and carboxyalkylene such as carboxymethylene, carboxyethylene, etc.

Particularly preferred compounds of Formula I are 4-[N-methyl - N - (2'-methoxycarbonylphenyl)-amino]-8-chloro-quinoline, 4-[N - methyl - N-(2'-carboxyphenyl)-amino]-8-chloroquinoline, 4-[N-methyl-N-(2'-methoxycarbonylphenyl) - amino]-7-chloroquinoline, 4-[N-carboxymethylene - N - (2' - methoxycarbonylphenyl)-amino]-7-chloroquinoline, 4 - [N-carboxymethylene-N-(2'-carboxyphenyl) - amino]-7-chloroquinoline and 4-(N-allyl-N-(2'-methoxycarbonylphenyl)-amino]-7-chloroquinoline.

The process of the invention for the preparation of the chloroquinolines of Formula I in which R is alkyl or alkenyl comprises reaction sodium hydride with a compound of the formula

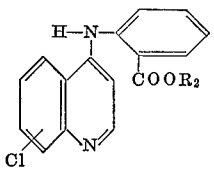

wherein $R_2$ is alkyl of 1 to 8 carbon atoms and Cl is in the 7- or 8-position to form a corresponding sodium derivative thereof, reacting the latter with an alkyl or alkenyl halide to form the corresponding 4-[N-alkyl or alkenyl-N-(2'-alkoycarbonyl-phenyl)-amino]-7- or 8-chloroquinoline which is then saponified with an alkaline agent to form the corresponding free 2'-carboxyl compound.

The process of the invention for the preparation of the chloroquinolines of Formula I in which R is carboxyalkylene comprising reacting sodium hydride with a compound of Formula II to form the corresponding sodium derivative, reacting the latter with an alkali metal salt of a halo lower alkanoic acid to form a compound of the formula

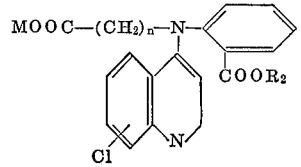

wherein $R_2$ has the above meaning, M is an alkali metal atom and $n$ is an integer from 1 to 6, and reacting the latter with an acid to form the free acid which can be saponified under alkaline conditions to form the corresponding 2'-carboxy compound. The acid addition salts can be made by reacting the free base with an appropriate acid.

The said reactions are preferably effected in a di-lower alkylamide such as dimethyl formamide and diethyl formamide and the alkaline agent is an alkali metal hydroxide such as sodium hydroxide or potassium hydroxide and the acidifying agent is preferably an organic acid, such as acetic acid.

The novel therapeutic compositions of the invention are comprised of at least one chloroquinoline of the formula

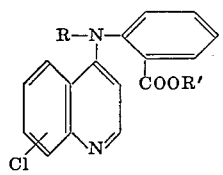

wherein R is selected from the group consisting of alkyl of 1 to 8 carbon atoms, alkenyl of 2 to 8 carbon atoms and carboxyalkylene of 2 to 7 carbon atoms and R' is selected from the group consisting of hydrogen and alkyl of 1 to 8 carbon atoms and their non-toxic, pharmaceutically acceptable acid addition salts and the chlorine is in the 7- or 8-position and a major amount of a pharmaceutical carrier.

The compositions may be in the form of injectable solutions or suspensions, in ampoules or multidose flacons in the form of tablets, coated tablets, capsules, suppositories, pomades, creams, topical powders in the form of sprays prepared in the usual manner. The usual useful unit dose is 50 to 500 mg.

The said compositions are useful for the treatment of inflammatory diseases such as ankylosing spondylarthritis. acute articular rheumatism, arthrosis, discopathy, lumbago and zona and as a complementary treatment of febrile and infectious conditions.

The novel method of the invention for reducing inflammation in warm-blooded animals comprises administering to warm-blooded animals an effective amount of at least one compound selected from the group consisting of 7- or 8-chloroquinolines of the formula

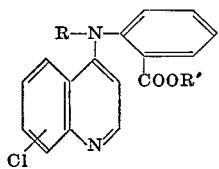

wherein R is selected from the group conststing of alkyl of 1 to 8 carbon atoms, alkenyl of 2 to 8 carbon atoms and carboxyalkylene of 2 to 7 carbon atoms and R' is selected from the group consisting of hydrogen and alkyl of 1 to 8 carbon atoms and their non-toxic, pharmaceutically acceptable acid addition salts. The said compounds may be administered orally, transcutaneously, rectally or as topical applications to the skin. The usual useful daily dose is 1.5 to 35 mg./kg. depending upon the mode of administration.

In the following examples there are described several preferred embodiments to illustrate the invention. However, it should be understood that the invention is not intended to be limited to the specific embodiments.

EXAMPLE I

Preparation of 4-[N - methyl-N-(2' - methoxycarbonylphenyl)-amino]-8-chloroquinoline 10 g. of 4-[2' - methoxycarbonylphenyl) - amino]8-chloroquinoline prepared by the process of Belgian Patent No. 619,997 and 1.62 g. of a dispersion of 50% sodium hydride in paraffin oil and 40 cc. of dimethylformamide were admixed and the mixture was agitated until all hydrogen had been released. Then 2.7 cc. of methyl iodide in 5 cc. of dimethyl formamide were added and the agitation was continued for two hours at room temperature. Then, 400 cc. of iced water and 0.2 cc. of acetic acid were added thereto and the mixture was agitated for two hours. The precipitate was filtered and oven dried to obtain 9.62 g. of crude N-methylated derivative which was purified by dissolution at reflux in isopropyl ether, concentration thereof and crystallisation at room temperature to obtain 7.5 g. of 4-[N-methyl-N-(2'-methoxycarbonylphenyl)-amino]-8-chloroquinoline having a melting point of 114° C.

The product was soluble in alcohol, ether, acetone, benzene and chloroform and insoluble in water.

Analysis.—$C_{18}H_{15}ClN_2O_2$; molecular weight=326.78. Calculated (percent): C, 66.15; H, 4.63; Cl, 10.85; N, 8.57. Found (percent): C, 65.9; H, 4.9; Cl, 10.6; N, 8.6.

This compound is not described in the literature.

EXAMPLE II

Preparation of 4-[N-methyl - N - (2'-carboxyphenyl)-amino]-8-chloroquinoline 3.5 g. of 4-[N-methyl-N-(2'-methoxycarbonyl-phenyl)-amino]-8-chloroquinoline, obtained in Example I, were dissolved in methanol and 10 cc. of 2 N aqueous sodium hydroxide were added thereto. The methanol was distilled off and replaced by water. The mixture was decolorized with charcoal, filtered and acidified. The product crystallised in the cold and the precipitate was filtered off and dried to obtain 2.6 g. of 4-[N-methyl-N-(2'-carboxyphenyl)-amino]-8-chloroquinoline having a melting point of 230° C.

The product was soluble in dilute aqueous acids and alkalis, slightly soluble in alcohol, ether, acetone, benzene and chloroform and sparingly soluble in water.

Analysis.—$C_{17}H_{13}ClN_2O_2$; molecular weight=312.76. Calculated (percent): C, 65.30; H, 4.16; Cl, 11.33; N, 8.96. Found (percent): C, 65.2; H, 4.4; Cl, 11.5; N, 8.8.

This compound is not described in the literature.

EXAMPLE III

Preparation of 4 - [N - methyl-N-(2' - methoxy - carbonylphenyl)-amino]-7-chloroquinoline Using the procedure of Example I, 7 g. of 4-[N-methyl-N-(2'-methoxy-carbonylphenyl) - amino]-7-chloroquinoline were prepared starting from 10 g. of 4-[(2'-methoxy-carbonphenylphenyl)-amino]-7-chloroquinoline (obtained by process of Belgian Patent No. 619,997). The said product had a melting point of 140° C.

The product was soluble in alcohol, acetone, benzene and chloroform, slightly soluble in ether and insoluble in water.

Analysis.—$C_{18}H_{15}ClN_2O_2$; molecular weight=326.78. Calculated (percent): C, 66.15; H, 4.63; Cl, 10.85; N, 8.57. Found (percent): C, 66.2; H, 4.9; Cl, 10.5; N, 8.2.

This compound is not described in the literature.

EXAMPLE IV

Preparation of 4-[N - carboxymethylene-N-(2'-methoxycarbonyl-phenyl)-amino]-7-chloroquinoline 10 g. of 4-[N-(2'-methoxycarbonylphenyl) - amino]-7-chloroquinoline and 1.62 g. of a dispersion of 50% sodium hydride in paraffin oil and 40 cc. of dimethylformamide were admixed and the mixture was agitated until hydrogen evolution had ceased. 7.65 of sodium monoiodo acetate were added thereto and the mixture was agitated for twelve hours. 120 cc. of iced water were then added and the mixture was filtered. The filtrate was acidified with 3 cc. of acetic acid and the precipitate was filtered, washed with water and oven-dried to obtain 9.1 g. of crude product which was purified by recrystallization from hot and cold dimethylformamide to obtain 4-[N-carboxymethylene - N - (2' - methoxycarbonylphenyl)- amino]-7-chloroquinoline having a melting point of 230° C.

The product was soluble in dimethylformamide and in dilute aqueous alkalis and insoluble in water, alcohol, ether, acetone, benzene and chloroform.

Analysis.—$C_{19}H_{15}ClN_2O_4$; molecular weight=370.79. Calculated (percent): C, 61.54; H, 4.08; Cl, 9.56; N, 7.56. Found (percent): C, 61.8; H, 4.0; Cl, 9.9; N, 7.9.

This compound is not described in the literature.

EXAMPLE V

Preparation of 4-[N-allyl-N-(2'-methoxycarbonylphenyl)-amino]-7-chloroquinoline 10 g. of 4-[N-(2'-methoxycarbonylphenyl)-amino]-7-chloroquinoline and 1.62 g. of a dispersion of 50% sodium hydride in paraffin oil and 40 cc. of dimethylformamide were admixed and the mixture was agitated for ninety minutes at +5° C., until hydrogen evolution had ceased. Then, 3.7 cc. of allyl bromide in 5 cc. of dimethylformamide were added thereto and the mixture was agitated for twelve hours at room temperature. The reaction mixture was poured into cold water while agitating and a precipitate formed. The precipitate was filtered off and dried in vacuo to obtain 11.1 g. of crude product which was purified by recrystallization from methanol and icing to obtain 5.6 g. of 4-[N-allyl-N-(2' - methoxycarbonylphenyl)-amino]-7-chloroquinoline having a melting point of 154° C.

The product was soluble in alcohol, acetone, benzene and chloroform, sparingly soluble in ether and insoluble in water.

Analysis.—$C_{20}H_{17}ClN_2O_2$; molecular weight=352.82. Calculated (percent): C, 68.10; H, 4.85; Cl, 10.05; N, 7.94. Found (percent): C, 68.4; H, 5.0; Cl, 10.1; N, 7.9.

This compound is not described in the literature.

EXAMPLE VI

Preparation of 4-[N-carboxymethylene-N-(2'-carboxyphenyl)-amino]-7-chloroquinoline 4 g. of 4 - [N-carboxymethyl-N-(2'-methoxycarbonylphenyl)-amino]-7-chloroquinoline (by Example IV) were dissolved in 20 cc. of N-aqueous sodium hydroxide and after 80 cc. of water were added thereto, the solution was heated to 50° C. for fifteen minutes and cooled. The solution was then decolorized with charcoal, filtered and acidified with 2 cc. of acetic acid. The precipitate was filtered off and washed with water and dried to obtain 2.95 g. of 4 - [N - carboxymethylene-N-(2'-carboxyphenyl)-amino]-7-chloroquinoline having a melting point of about 290° C. (with decomposition).

The product was soluble in dilute aqueous alkalies and insoluble in water and in the most usual solvents.

Analysis.—$C_{18}H_{13}ClN_2O_4$; molecular weight=356.76. Calculated (percent): C, 60.60; H, 3.67; Cl, 9.94; N, 7.85. Found (percent): C, 60.8; H, 4.0; Cl, 9.7; N, 7.9.

This compound is not described in the literature.

PHARMACOLOGICAL STUDY

Anti-inflammatory activity

The test employed was that described by Branceni et al. (Arch. Int. Pharmacodyn, 1964, 152, 15), slightly modified. This consisted in the administration to rats weighing approximately 150 gm. each of a single injection of 500γ of naphthoyl-heparamide into the skin of the sole of a hind paw, this injection being intended to develop an inflammatory edema. The product to be studied was orally administered in an aqueous suspension, one hour prior to the injection. The amount of inflammation was determined by plethysmometry, the size of the paw being measured immediately prior and 2 hours after the irritating injection. The results obtained were expressed:

(a) either by the degree of inflammation calculated as a percentage of that of the control animals, this degree of inflammation being furnished by the difference of the averages of the two measurements (average volume at the hour $H_2$ average initial volumes $H_0$), (b) or by the volumes at the hour $H_2$, adjusted to their initial level by the analysis of covariance. The statistic validity of the difference between each adjusted average and that of the control group was established by the Dunnett test (Amer. J. St. Aboc., 50, 1 096 [1955]).

The compounds of the invention were administered as an aqueous suspension.

TABLE I

| Example | Test compound | Dose mg./kg. | Volume of 2 hour average [1] | Degree of inflammation in percent of that of the controls |
|---|---|---|---|---|
| III | Control | 0 | 55.7 | 100 |
|  | Treated | 25 | 43.2 | 44 |
|  | Control | 0 | 50.1 | 100 |
|  | Treated | 100 | 31.8 | 13 |
| I | Control | 0 | 57.7 | 100 |
|  | Treated | 30 | 45.2 | 45 |
|  | Control | 0 | 48.8 | 100 |
|  | Treated | 90 | 38.6 | 39 |
|  | Control | 0 | 54.0 | 100 |
|  | Treated | 100 | 35.8 | 24 |
| II | Control | 0 | 57.7 | 100 |
|  | Treated | 30 | 55.6 | 91 |
|  | Control | 0 | 54.0 | 100 |
|  | Treated | 100 | 43.9 | 55 |
| V | Control | 0 | 48.3 | 100 |
|  | Treated | 20 | 38.5 | 47 |
|  | Control | 0 | 57.7 | 100 |
|  | Treated | 50 | 40.9 | 36 |
| IV | Control | 0 | 48.3 | 100 |
|  | Treated | 20 | 40.8 | 56 |
|  | Control | 0 | 57.7 | 100 |
|  | Treated | 50 | 42.5 | 28 |

[1] Adjusted by analysis of covariance.

The results of Table I clearly show the compounds of the invention possess a distinct anti-inflammatory activity and that some products are active in doses as low as 20 mg./kg.

Various modifications of the compositions and method of the invention may be made without departing from the spirit or scope thereof.

We claim:

1. A compound selected from the group consisting of 7- or 8-chloroquinolines of the formula $$\text{(Structure I: quinoline with Cl substituent, N in ring, and 4-position bearing N(R)-phenyl-COOR')}$$

wherein R is selected from the group consisting of alkyl of 1 to 8 carbon atoms, alkenyl of 2 to 8 carbon atoms and carboxyalkylene of 2 to 7 carbon atoms and R' is selected from the group consisting of hydrogen and alkyl of 1 to 8 carbon atoms and their non-toxic, pharmaceutically acceptable acid addition salts.

2. A compound of claim 1 which is 4-[N-methyl-N-(2'-methoxycarbonylphenyl)-amino]-8-chloroquinoline.

3. A compound of claim 1 which is 4-[N-methyl-N-(2'-carboxyphenyl)-amino]-8-chloroquinoline.

4. A compound of claim 1 which is (4-[N-methyl-N-(2'-methoxycarbonylphenyl)-amino]-7-chloroquinoline.

5. A compound of claim 1 which is 4-[N-carboxymethylene - N - (2' - methoxycarbonylphenyl)-amino]-7-chloroquinoline.

6. A compound of claim 1 which is 4-[N-allyl-N-(2'-methoxycarbonylphenyl)-amino]-7-chloroquinoline.

7. A compound of claim 1 which is 4 - [N - carboxymethylene - N - (2' - carboxyphenyl) - amino]-7-chloroquinoline.

8. A process for the preparation of a compound of claim 1 in which R is other than carboxy alkylene which comprises reacting sodium hydride with a compound of the formula

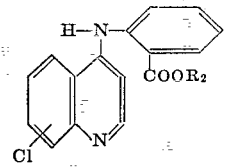

wherein $R_2$ is alkyl of 1 to 8 carbon atoms and the chlorine is in the 7- or 8-position to form the corresponding sodium derivative, reacting the latter with a compound selected from the group consisting of alkyl halide of 1 to 8 carbon atoms and alkenyl halide of 2 to 8 carbon atoms to form the corresponding 4-[N-alkyl or alkenyl - N-(2'-alkoxycarbonyl-phenyl)-amino]-chloroquinoline.

9. A process of claim 8 wherein the said 2'-alkoxycarbonyl compound is saponified with an alkali metal hydroxide.

10. A process for the preparation of a compound of claim 1 in which R is carboxyalkylene of 2 to 7 carbon atoms which comprises reacting sodium hydride with a compound of the formula

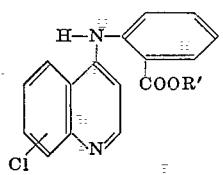

wherein $R_2$ is alkyl of 1 to 8 carbon atoms and the chlorine is in the 7- or 8-position to form the corresponding sodium derivative, reacting the latter with an alkali metal salt of a halo lower alkanoic acid to form a compound of the formula

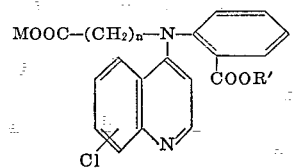

wherein $R_2$ has the above definition, M is an alkali metal and $n$ is an integer from 1 to 6 and reacting the latter with an acid to form the corresponding 4-[N-carboxyalkylene-N-(2'-alkoxycarbonyl-phenyl)-amino] - chloroquinoline.

11. The process of claim 10 wherein the said 4-[N-carboxyalkylene - N - (2' - alkoxycarbonyl - phenyl)-amino] is saponified with an alkali metal hydroxide to form the corresponding 2-carboxyphenyl compound.

References Cited
UNITED STATES PATENTS

| Re. 24,265 | 1/1957 | Burckhalter et al. | 260—288 |
| 1,810,267 | 6/1931 | Desamari | 260—287 |
| 2,652,398 | 9/1953 | Kaye | 260—288 |
| 3,174,972 | 3/1965 | Allais et al. | 260—287 |
| 3,272,824 | 9/1966 | Ebetino | 260—288 |

DONALD G. DAUS, Primary Examiner

U.S. Cl. X.R.

260—286; 424—258